United States Patent [19]
Ferrazzi

[11] Patent Number: 5,808,847
[45] Date of Patent: Sep. 15, 1998

[54] ELECTRONIC TRIP DEVICE COMPRISING A POWER SUPPLY DEVICE

[75] Inventor: Marc Ferrazzi, Fontaine, France

[73] Assignee: Schneider Electric S.A., France

[21] Appl. No.: 794,990

[22] Filed: Feb. 5, 1997

[30] Foreign Application Priority Data

Feb. 22, 1996 [FR] France .................................. 96 02429

[51] Int. Cl.⁶ ....................................................... H02H 3/00
[52] U.S. Cl. .............................. 361/93; 361/86; 361/102; 307/86
[58] Field of Search ................................. 361/18, 93, 102, 361/78, 86; 307/44, 60, 64, 85–86

[56] References Cited

U.S. PATENT DOCUMENTS 3,689,801  9/1972  Engel et al. ............................. 307/63
4,583,004  4/1986  Yearsin ..................................... 307/64

FOREIGN PATENT DOCUMENTS 3736336   4/1988  Germany.
2073975  10/1981  United Kingdom.

*Primary Examiner*—Jeffrey A. Gaffin
*Assistant Examiner*—Michael J. Sherry
*Attorney, Agent, or Firm*—Parkhurst & Wendel, L.L.P.

[57] ABSTRACT

An electronic trip device for a circuit breaker comprising at least one current sensor supplying a current to a first power supply circuit. A distribution line connected to an output of the first power supply circuit distributes an electrical voltage regulated by a first chopping regulator to electronic circuits of the trip device. The trip device comprises a second power supply circuit connected to an external power source and a second chopping regulator connected between the second power supply circuit and the distribution line. The second chopping regulator operates in synchronized manner with the first chopping regulator.

9 Claims, 5 Drawing Sheets

ELECTRONIC TRIP DEVICE COMPRISING A POWER SUPPLY DEVICE

BACKGROUND OF THE INVENTION

The invention relates to an electronic trip device for a circuit breaker comprising
- at least one current sensor supplying a secondary current representative of a current flowing in a conductor of a power system protected by the circuit breaker,
- a processing unit receiving signals representative of currents flowing in conductors of the power system protected by the circuit breaker, and supplying a tripping order,
- a first power supply circuit comprising an input connected to said current sensor, an output connected to a power supply line supplying electrical and electronic circuitry of the trip device, and first regulating means connected between the input and the output of said first power supply circuit, and
- a second power supply circuit comprising an input connected to an external electrical power source and an output connected to the power supply line.

Electronic trip devices of known types comprise power supply circuits to supply the electrical power necessary for operation of the electronic circuitry and trip relay. The power supply circuits are generally connected to current transformers fitted on power conductors of the power system to be protected. The currents supplied by the transformers are rectified then applied to a power supply circuit which supplies DC voltages to the different circuit breaker circuits.

The power supply circuits comprise in state of the art manner chopping regulators which short-circuit the secondary current of the transformers when the voltage supplied exceeds a preset threshold. The current supplied by the current transformers is generally sufficient to enable normal operation of the trip device.

The trip devices can comprise auxiliary circuits designed for functions connected to electrical protection, for example electrical power measurement, load monitoring, isolation or leakage current monitoring. When auxiliary circuits are present in the trip device, the current supplied by the transformers may not be sufficient to supply all the circuits.

The main function of electronic trip devices being protection of the electrical power systems, the electrical power supplied by the transformers is reserved in priority for the circuits performing this protection. In certain known trip devices, power supply management devices disable operation or stop the power supply of auxiliary circuits when the current supplied by the transformers becomes insufficient.

It is also known to use an additional power supply circuit to make up for the insufficiency of current supplied by the transformers. The power supply circuit is connected to a voltage source external to the circuit breaker and performs power supply of the circuit breaker continuously, even when the current from the transformers is very low or nil.

The external voltage source applied to the power supply circuits can have high values. It generally corresponds to the voltage of the power supply system to be protected, for example 100 to 700V. However, the voltage supplied by the power supply circuits has a low value of about 10V to 20V and preferably has to be galvanically isolated from the external source. The electrical power dissipated by the power supply circuits is then generally high and means that bulky electronic power components have to be used.

The additional power supply circuits can easily be incorporated in circuit breakers of very large dimensions. For circuit breakers of smaller dimensions, said circuits are usually fitted in modules external to the circuit breakers.

Integrating additional power supply circuits is very difficult. The space available in circuit breakers of medium or small dimensions is generally very small and the flow of large currents in the contacts and main conductors of the circuit breakers causes the working temperature to rise. This high temperature in circuit breakers would lead to increasing the dimensions of the components forming the circuitry. An increase of the volume occupied by the components would then be incompatible with the small space available in the circuit breakers.

SUMMARY OF THE INVENTION

The object of the invention is to achieve an electronic trip device comprising an integrated additional power supply device.

According to the invention, the trip device comprises second regulating means comprising an input connected to the output of the second power supply circuit, an output connected to the power supply line and control means connected to the first chopping regulating means, the control means controlling the second regulating means to reduce the mean current supplied by the second power supply circuit when the current supplied by the current sensor increases.

In a particular embodiment, the second regulating means comprise current limiting means connected between the input and output of said regulating means, said current limiting means being controlled by the control means.

According to a preferred embodiment, the first regulating means comprise a first chopping regulator, the second regulating means comprise a second chopping regulator, and the control means comprise synchronization means connected between the first and second chopping regulators.

In a development of the preferred embodiment:
- the first chopping regulator comprises current diverting means connected to the input of the first regulating means and first detection means connected between the power supply line and the diverting means, said detection means ordering short-circuiting of the input of the first regulating means when the voltage of the power supply line exceeds a first preset threshold, and
- the second chopping regulator comprises current interrupting means controlled by the control means, the control means ordering interruption of the current supplied by the second regulator when the first regulating means order short-circuiting of the input of the first regulating means.

In a first development of the invention, the output of the second regulating means is connected to the input of the first regulating means.

In a second development of the invention, the output of the second regulating means is connected to the output of the first regulating means.

Preferably, the second power supply circuit comprises a rectifier circuit connected to the external electrical power source, a voltage limiter connected to the outputs of the rectifier circuit, and a chopper connected to outputs of the limiter and supplying a voltage to an input of the second regulating means.

The chopper comprises a transformer comprising a primary winding supplied by means of an oscillator and a secondary winding electrically isolated from the primary winding and connected to the input of the second regulating means.

The chopper is preferably of the flyback type.

BRIEF DESCRIPTION OF THE DRAWINGS

Other advantages and features will become more clearly apparent from the following description of illustrative embodiments of the invention, given as non-restrictive examples only and represented in the accompanying drawings in which.

DETAILED DESCRIPTION OF THE PREFERRED EMBODIMENT

Figure 1:
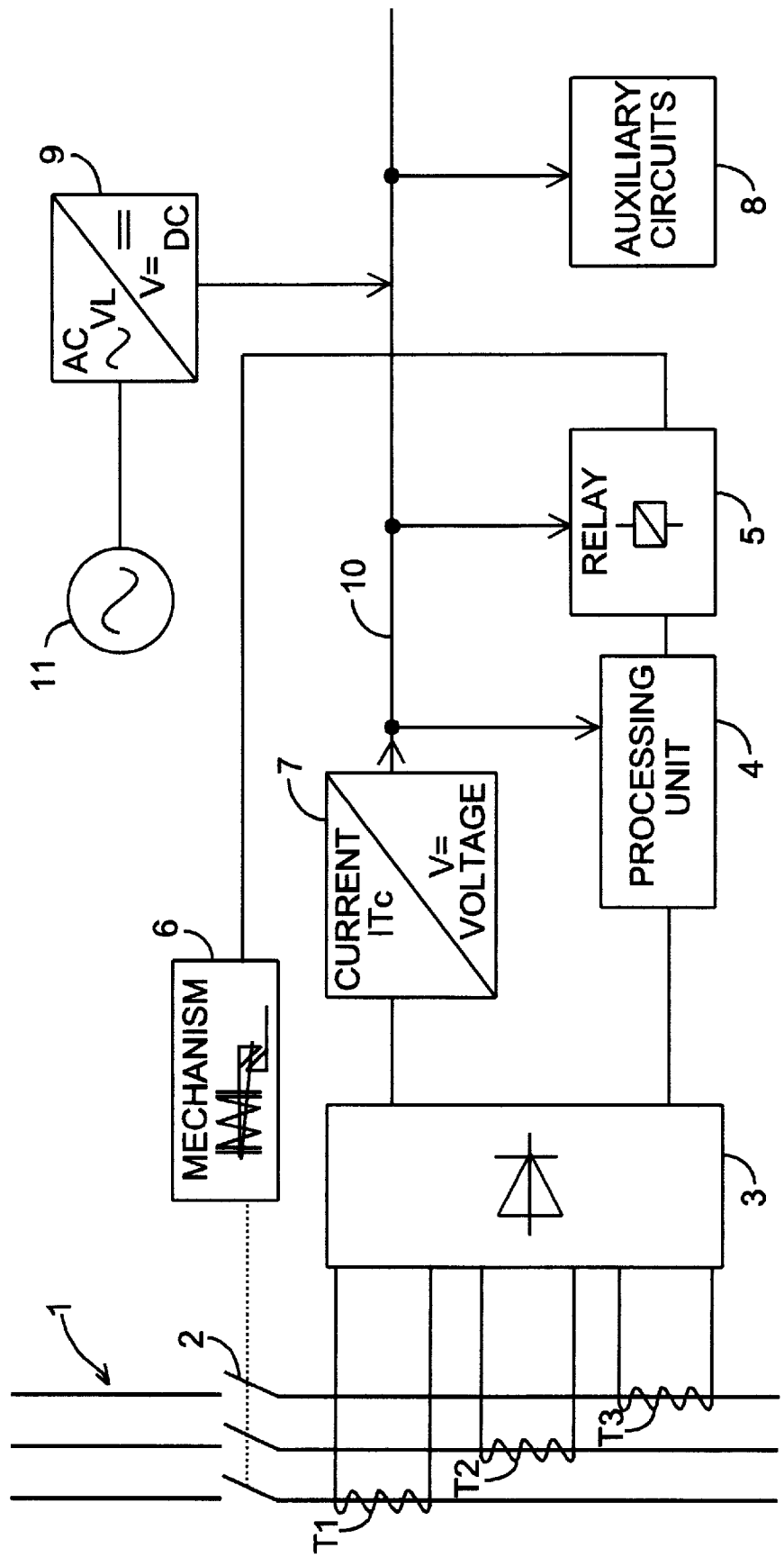
FIG. 1 represents the diagram of a known trip device associated to a circuit breaker.

FIG. 1 represents a circuit breaker of known type. An electrical power system 1 to be protected comprises electrical conductors connected to contacts 2 enabling the current to be established or interrupted. Current sensors T1, T2, T3 associated to the different conductors of the power system transform the primary currents of high intensity into secondary currents compatible with electronic trip devices. The secondary currents are applied to the input of a rectifying and detection circuit 3. This circuit supplies signals representative of the currents to an electronic processing unit 4 and a power supply current to a first power supply circuit 7 of the trip device. A tripping order produced by the processing unit 4 is applied to the input of a control relay 5 which actuates an opening mechanism 6 of the circuit breaker contacts 2. The power supply circuit 7 supplies the electrical and electronic circuits of the trip device, notably the processing unit 4, relay 5 and auxiliary circuits 8 via a power supply line 10.

A second power supply circuit 9, connected between an external electrical power source 11 and the power supply line 10, supplies the electrical and electronic circuits 4, 5 and 8 of the trip device when the current supplied by the sensors is no longer sufficient.

In the drawing of FIG. 1, the first power supply circuit 7 converts the current Itc supplied by the sensors into one or more DC voltages supplying the power supply line 10. The second power supply circuit 9 converts a first DC or AC voltage VL supplied by the source 11 into a second DC voltage supplying the line 10. The power supply line is preferably galvanically isolated from the external source 11.

Figure 2:
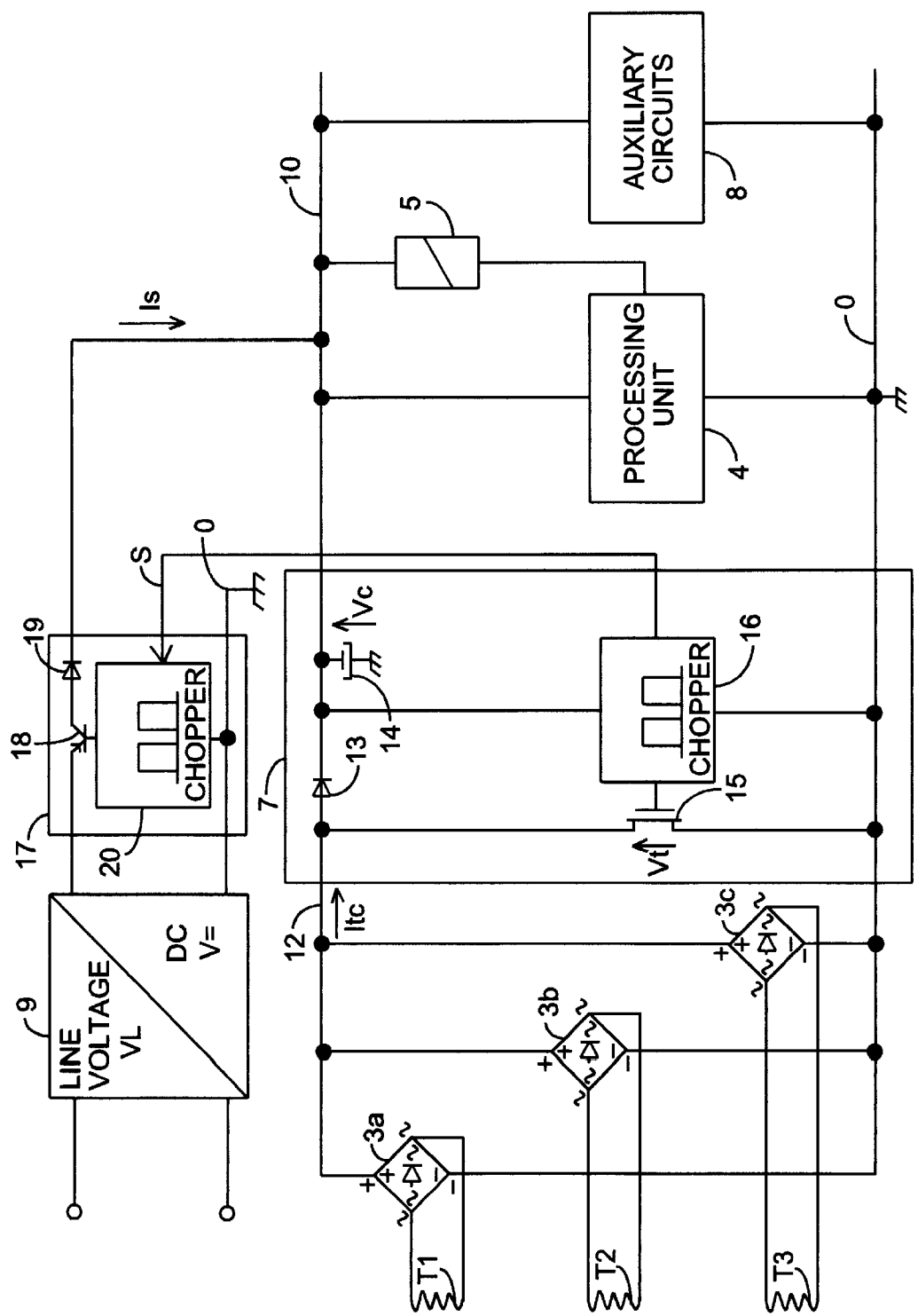
FIG. 2 represents the diagram of a trip device according to a first embodiment of the invention.

In the electronic trip device represented by the drawing of FIG. 2, the current transformers T1, T2 and T3 are connected to AC inputs of three rectifier bridges, respectively 3A, 3b and 3c. The positive outputs of the rectifier bridges are connected to a line 12 and the negative outputs of said bridges are connected to a reference line 0. The line 12 connects the positive outputs of the bridges to an input of the first power supply circuit 7. The secondary currents generated by the current transformers are rectified by the bridges 3a, 3b and 3c, then supplied to the input of the first power supply circuit 7.

In state of the art manner, the first power supply circuit 7 comprises a diode 13 connected between an input connected to the line 12 and an output connected to the power supply line 10, a capacitor 14 connected between the output and the reference line 0, a transistor 15 connected between the input and the reference line 0, and a first chopping controller 16 connected between the power supply line 10 and the reference line 0 and comprising an output connected to a control electrode of the transistor 15.

The current supplied by the transformers T1, T2 or T3 is rectified by the bridges 3a, 3b or 3c. Then, so long as the transistor 15 is off, said current flows through the diode 13, charges the capacitor 14 and supplies the circuits connected to the line 10. When the voltage between the line 10 and the reference line 0, i.e. the voltage Vc at the terminals of the capacitor 14, exceeds a preset voltage threshold, the chopping regulator 16 orders turn-on of the transistor 15. The current from the transformers is then diverted to the reference line 0 and no longer flows via the power supply line 10. The diode 13 blocks discharging of the capacitor to the transistor 15.

The chopping regulator 16 controls turn-on and turn-off of the transistor 15 according to the voltage present on the power supply line 10. The chopping frequency and cycle rate vary according to the current from the transformers and to the current absorbed by the circuits connected to the line 10. If the current from the transformers increases, the mean time during which the transistor 15 is turned on increases and the time during which said transistor is turned off decreases, the capacitor charging current being higher.

According to a first embodiment of the invention, the trip device of FIG. 2 comprises a current regulating circuit 17 connected between the second power supply circuit 9 and the power supply line 10. The circuit 17 comprises an input receiving a DC or rectified voltage supplied by the power supply circuit 9 and an output supplying a regulated current to the line 10. Regulation of the current of the circuit 17 is such that it decreases the mean value of the current supplied by the circuit 17 to the line 10 when the secondary current of the transformers T1, T2 or T3 increases.

The regulation circuit 17 comprises a transistor 18 and diode 19 connected in series between its input and its output, and a control device 20 connected to the base of the transistor 18 for control of the supply of current to the line 10. The monitoring device 20 controls the transistor 18 in chopping. It comprises an input connected by a synchronization line S to the chopping regulator 16.

In this embodiment of the invention, the control device is synchronized with the chopping regulator 16. When the regulator detects an increase of the line voltage, it orders turn-on of the transistor 15 to divert the input current of the power supply circuit 7 and sends a signal to the device 20 to disable the output current of the regulating circuit 17.

The current supplied by the regulating circuit 17 is synchronized with the charge of the capacitor 14. When the transistor 15 is off, the current from the transformers and the current from the circuit 17 are added to charge the capacitor 14 and increase the voltage of the line 10. During discharging of the capacitor, the current from the transformers is diverted to the line 0 and the current supplied by the circuits 9 and 17 is zero.

The time during which the capacitor 14 charges depends on the value of the current supplied by the current transformers and on the value of the current supplied by the circuit 17. The mean value of the current supplied by the circuit 17 depends on the cycle rate corresponding to the charging and discharging time of the capacitor 17. The circuit 17 supplies current to the line 10 only during charging of the capacitor. When the current supplied by the transformers increases, the charging time of the capacitor is reduced and the mean current supplied by the circuit 17 decreases.

Figure 3:
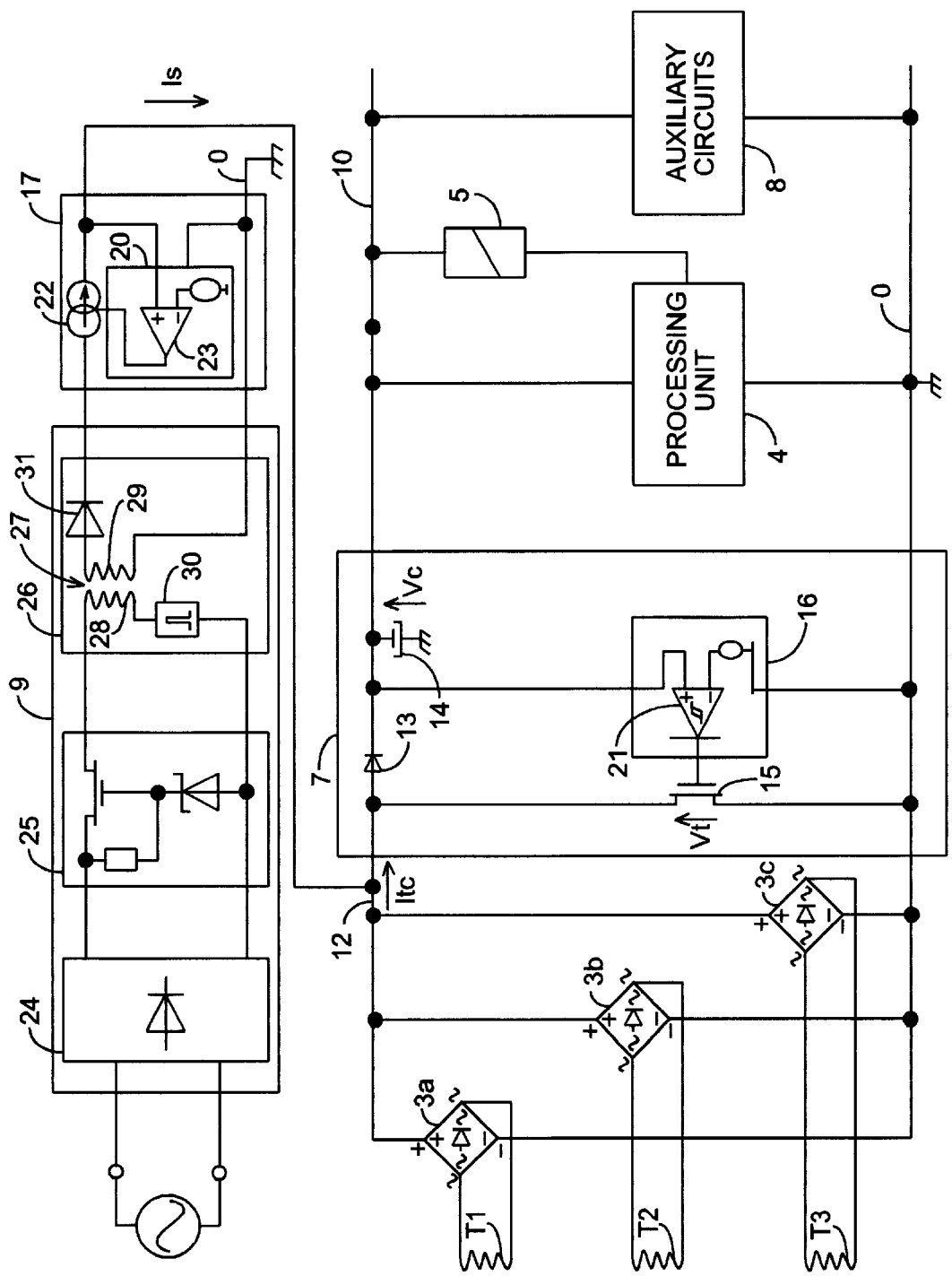
FIG. 3 represents the diagram of a trip device according to a second embodiment of the invention.

The drawing of FIG. 3 shows another embodiment of a trip device according to the invention. The output of the regulating circuit 17 is connected to the input of the first power supply circuit 7. The regulator 16 comprises a first comparator 21 with hysteresis to compare the voltage of the line 10 with a reference voltage and control operation of the transistor 15. The circuit 17 comprises a controlled current limiter 22 connected between the input and output of the circuit 17.

The control circuit 20 comprises a second comparator 23 having a first input connected to the output of the circuit 17, a second input connected to a reference voltage and an output connected to the current limiter 22 to control the output current of the circuit 17.

Synchronization of the control circuit 20 with the chopping regulator 16 is performed by means of the connection between the output of the circuit 17 and the input of the circuit 7. When the capacitor has to be charged, the comparator 21 orders turn-off of the transistor 15. The current from the transformers T1, T2 or T3 is then directed to the capacitor 14 and line 10. The comparator 23 of the circuit 20 detects a high voltage Vt on the output of the circuit 17 (voltage at the terminals of the transistor 15 which is off) and orders supply of a current by the circuit 17 to the input of the circuit 7. The current supplied by the circuit 17 is added to the current from the current transformers.

As soon as the voltage Vc at the terminals of the capacitor 14, i.e. the voltage of the line 10, reaches a preset threshold, the comparator 21 orders turn-on of the transistor 15 to divert the input current of the circuit 7. The short-circuit achieved by the transistor 15 makes the voltage Vt at the input of the circuit 7 and at the output of the circuit 17 drop. The comparator 23 detects this low voltage due to the short-circuit and disables the current limiter 22 to interrupt the supply of current to the input of the circuit 7.

As in the first embodiment, the circuit 17 supplies current to the line 10 only during charging of the capacitor. The current flows, in this case, through the first power supply circuit 7.

In the drawing of FIG. 3, a particular embodiment of the second power supply circuit 9 comprises a rectifier circuit 24 connected to the external source 11, a voltage limiter 25 connected to outputs of the rectifier circuit, and a chopper 26 connected to outputs of the limiter 25 and supplying a voltage to the input of the circuit 17.

The rectifier 24 comprises inputs connected to the external source 11 and outputs supplying a DC or polarized voltage. The source 11 can be DC or AC, single-phase or three-phase. The circuit 25 limits the maximum value of the DC voltage applied to the inputs of the chopper 26.

The chopper 26 comprises a transformer 27 having a primary winding 28 and a secondary winding 29. The primary winding is connected to the inputs of the chopper and supplied via an electronic oscillator 30. The secondary winding is connected to the circuit 17 by means of a rectifier diode 31. The transformer 27 isolates the source 11 galvanically from the trip device.

Operation of the chopper is preferably of the Flyback type.

Figure 4A:
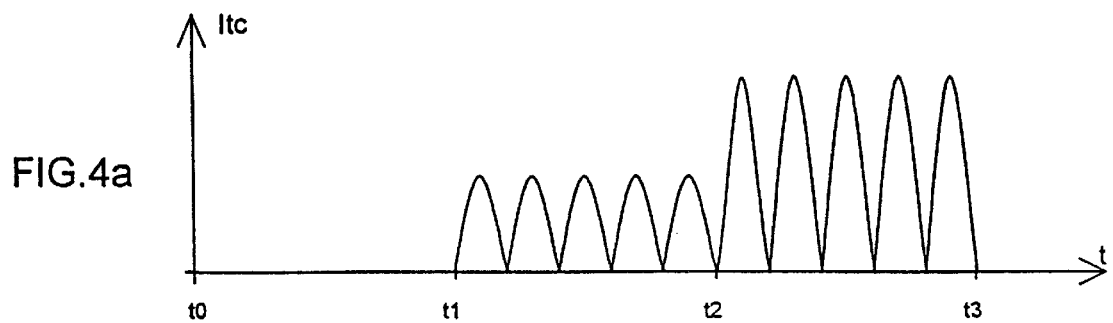
FIGS. 4a to 4d show electrical signals representative of a regulating mode in a trip device according to FIGS. 2 or 3.
Figure 4B:
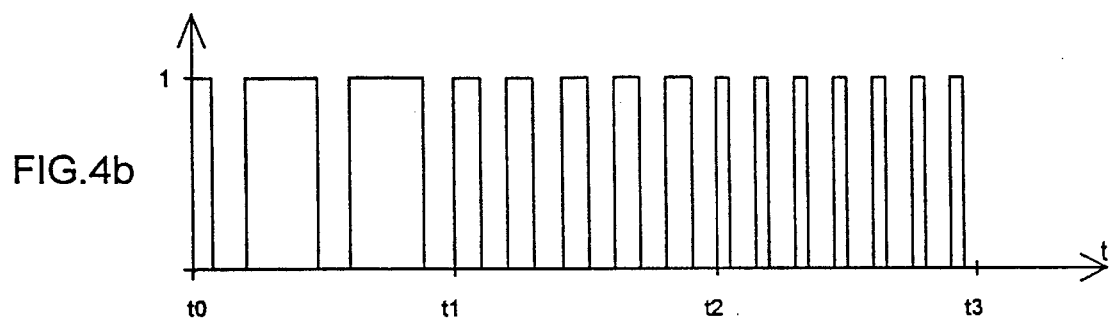
Figure 4C:
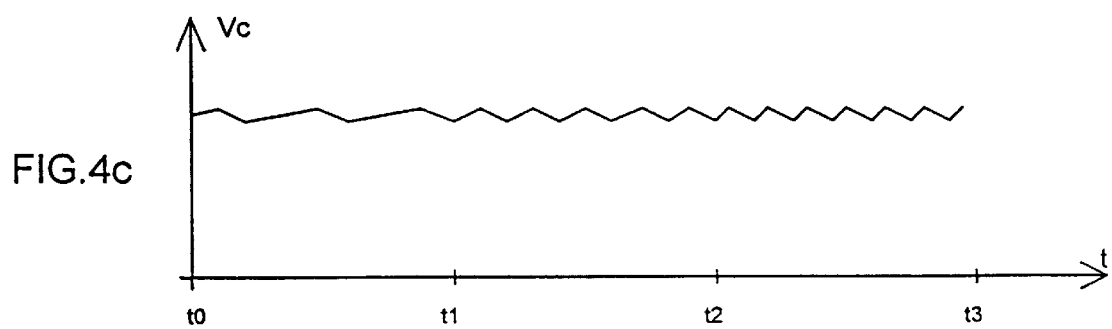

In FIGS. 4a to 4c signals are represented representative of the power supply of a trip device according to the invention. FIG. 4a shows the current Itc supplied by the current transformers. Between the times t0 and t1, the current is zero. Between the time t1 and t2, the current is of small amplitude and between the time t2 and t23, the current is of large amplitude.

FIG. 4b shows the state of the transistor 15 and the corresponding voltage at its terminals Vt. State 1 means that the transistor 15 is off and that the voltage Vt is high, appreciably equal to the voltage of the line 10. State 0 means that the transistor 15 is on and that its voltage Vt is very low, close to 0 Volts.

FIG. 4c shows the signal Vc representative of the voltage of the line 10, or voltage at the terminals of the capacitor 14. The variations of the voltage Vc represent charging and discharging of the capacitor 14.

Figure 4D:
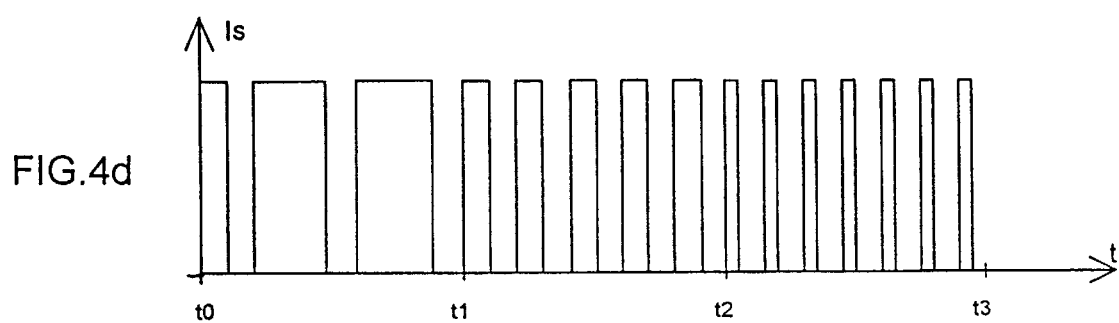

FIG. 4d shows the current Is supplied by the regulating circuit 17.

Between the times t0 and t1, the current Itc is zero, and the trip device is supplied only by the current supplied the circuit 17. The charging time of the capacitor is long and, in each charge/discharge cycle of the capacitor, the supply time of the current Is is greater than the time during which said current Is is turned off. In the embodiment represented at the time t0, the capacitor 14 is already charged at a voltage close to the threshold voltage controlling turn-on of the transistor 15, the external power supply already being in operation.

Between the times t1 and t2, the current Itc is low, the trip device is supplied by the current Is and the current Itc. The duration of supply of the current Is, per cycle, is lower than between the times t0 and t2. The mean current supplied by the circuit 17 to the line 10 therefore decreases.

Between the times t2 and t3, the current Itc is high, the charging time is reduced and the duration of supply of the current Is, per cycle, lower than the duration of turn-off of said current Is is shorter than between t1 and t2. The mean current supplied by the circuit 17 to the line 10 therefore decreases even more.

Figure 5:
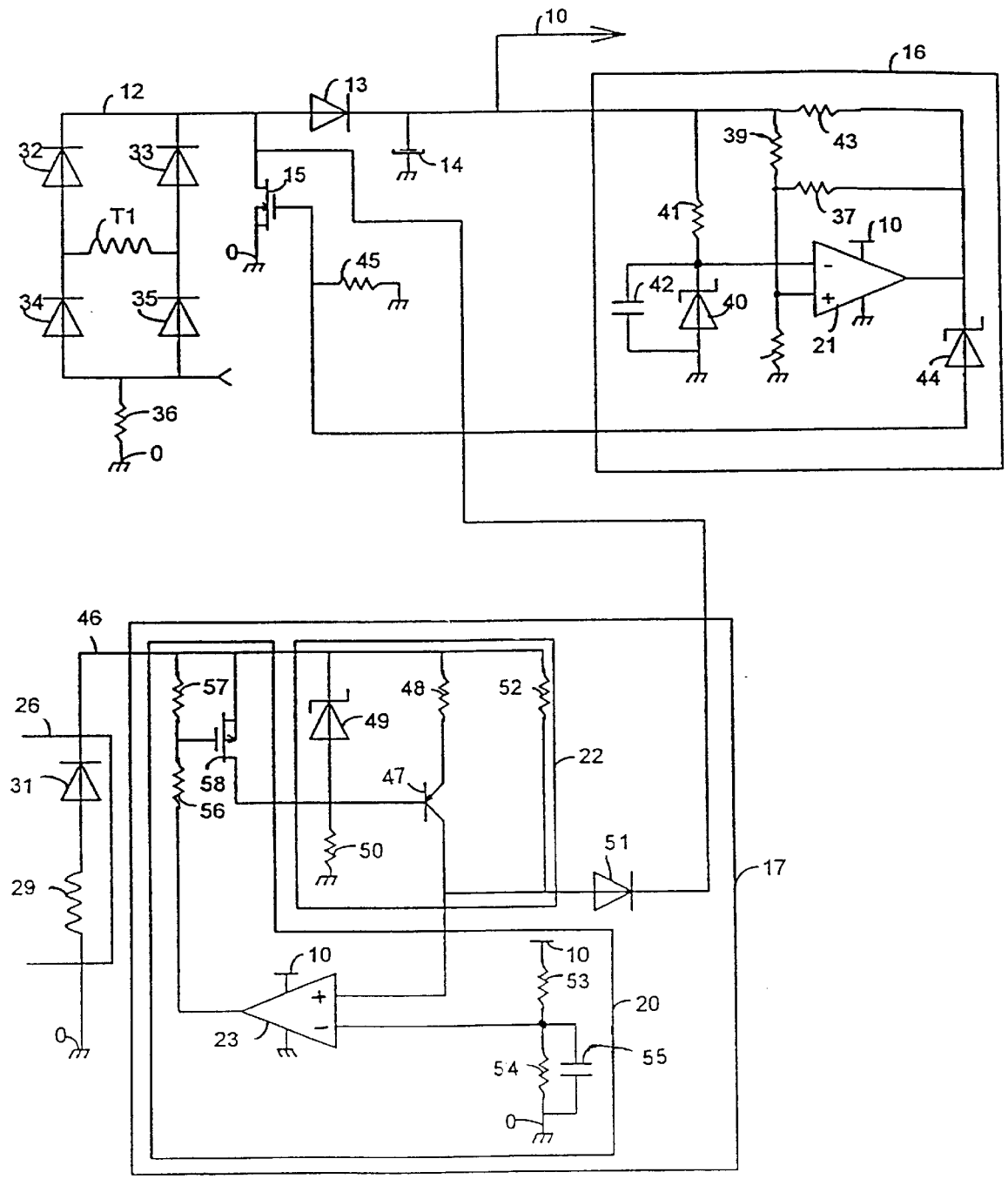
FIG. 5 represents a detailed diagram of a trip device according to FIG. 3.

FIG. 5 shows a detailed drawing of a particular embodiment of the power supply of a trip device according to FIG. 3. In this drawing, only the transformer T1 is represented. The rectifier 3a is represented by four diodes 32, 33, 34 and 35 connected as a full-wave rectifier. The cathodes of the diodes 32 and 33 supply positive current to the line 12 connected to transistor 15 and to the diode 13. The anodes of the diodes 34 and 35 receive the current feedback via a measuring resistor 36 and the reference line 0.

The regulating circuit 16 comprises the comparator 21 operating according to a hysteresis cycle. Resistors 37, 38 and 39 are connected between the non-inverting input and respectively the output of the comparator, the line 0 and the line 10, thus determining the threshold and window of the hysteresis. A zener diode 40 connected between the inverting input and the line 0 sets a reference voltage of the comparator. Polarization of the diode 40 is performed by a resistor 41 connected between the line 10 and the cathode of said diode. A capacitor 42 connected in parallel to the diode 40 improves the operation on power-up. The output of the comparator is polarized by a resistor 43 connecting the output of said comparator to the line 10. A zener diode connected between the output of the comparator 21 and the gate of the transistor 15 limits the control voltage of the transistor. Polarization of the gate of the transistor 15 and of the zener diode 44 is performed by a resistor 45 connecting the gate of the transistor 15 to the line 0.

The chopper 26 only a part of which is represented in FIG. 5, supplies a polarized voltage. This voltage is a DC voltage or, more generally, in the form of pulses. The chopper voltage is applied to the current limiter 22 via a line 46. The limiter 22 comprises a transistor 47 having an emitter connected to the line 46 via a resistor 48. The base voltage of the transistor 47 is determined by a zener diode 49 connected between said base and the line 46 and by a polarizing resistor 50 connected between the anode of the diode 49 and the line 0. The value of the limited current is given by: (V2−Vbe)/R, where V2 is the voltage of the zener diode 49, Vbe is the base emitter voltage of the transistor 47 and R the value of the resistance 48.

The output of the current limiter is made on the collector of the transistor 47. The limited current flows via a diode 51 and is then added to the current from the transformers on the line 12. A resistor 52 connected between the collector of the transistor 47 and the line 46 enables regulation of the voltage of the line 10 to be triggered and facilitated when the supply current is provided by the circuit 17 only.

The control circuit 20 comprises the comparator 23 and a control transistor 58. The inverting input of the comparator is connected to a common point of a resistive divider bridge formed by two resistors 53 and 54. The resistor 53 is connected between the common point and the line 10, and the resistor 54 is connected between the line 0 and the common point. A capacitor 55 is connected to the terminals of the resistor 54 to filter the voltage of the divider bridge. The resistive divider bridge 53, 54 supplies a reference voltage to the inverting input of the comparator 23. The non-inverting input of the comparator 23 is connected to the output of the limiter 22, that is to say to the collector of the transistor 47.

The output of the comparator 23 is connected to the control gate of the transistor 58 by means of a resistor 56. A polarizing resistor 57 is connected between the gate and source of the transistor 52.

When the transistor 15 is off, the voltage of the line 12 is at a high value, the non-inverting input of the comparator 23 at a voltage greater than the reference voltage applied to its inverting input and the comparator 23 does not order turn-on of the transistor 58. The current limiter 22 then supplies a current which is added to the current of the transformer T1.

If the voltage of the line 12 increases, the comparator 21 orders turn-on of the transistor 15. The voltage of the non-inverting input of the comparator 23 becomes lower than the reference voltage applied to its inverting input. The output of the comparator 23 then orders turn-on of the transistor 58 which short-circuits the zener diode 49. The transistor 47 is then turned-off and the current limiter only supplies a very low current flowing in the resistor 52.

The trip device according to the invention generally comprises current transformers with magnetic circuits which supply both current measuring signals and the electrical power supply. In other embodiments, a trip device according to the invention can comprise air transformers, of Rogowski toroid type, for measuring the current and magnetic circuit transformers for the electrical power supply.

In the embodiments described above, a single power supply line 10 supplies the trip device circuits, but it is possible to achieve trip devices according to the invention comprising several power supply lines designed for various circuits and having different voltages.

What is claimed is:

1. An electronic trip device for a circuit breaker, comprising:
    at least one current sensor supplying a secondary current representative of a current flowing in a conductor of a power system protected by the circuit breaker,
    a processing unit receiving signals representative of currents flowing in conductors of the power system protected by the circuit breaker, and supplying a tripping order,
    a first power supply circuit comprising an input connected to said current sensor, an output connected to a power supply line supplying electrical and electronic circuitry of the trip device, and first regulating means connected between the input and the output of said first power supply circuit, and
    a second power supply circuit comprising an input connected to an external electrical power source and an output connected to the power supply line,
    second regulating means comprising an input connected to the output of the second power supply circuit, an output connected to the power supply line and control means connected to a first chopping regulating means, the control means controlling the second regulating means to reduce the mean current supplied by the second power supply circuit when the current supplied by the current sensor increases.

2. The trip device according to claim 1, wherein the regulating means comprises current limiting means connected between the input and output of said second regulating means, said current limiting means being controlled by the control means.

3. The trip device according to claim 1, wherein the first regulating means comprise a first chopping regulator, the second regulating means comprise a second chopping regulator, and the control means comprise synchronization means connected between the first and second chopping regulators.

4. The trip device according to claim 3, wherein:
    the first chopping regulator comprises current diverting means connected to the input of the first regulating means and first detection means connected between the power supply line and the diverting means, said detection means ordering short-circuiting of the input of the first regulating means when the voltage of the power supply line exceeds a first preset threshold, and
    the second chopping regulator comprises current interrupting means controlled by the control means, the control means ordering interruption of the current supplied by the second regulator when the first regulating means order short-circuiting of the input of the first regulating means.

5. The trip device according to claim 1, wherein the output of the second regulating means is connected to the input of the first regulating means.

6. The trip device according to claim 1, wherein the output of the second regulating means is connected to the output of the first regulating means.

7. The trip device according to claim 1, wherein the second power supply circuit comprises a rectifier circuit connected to the external electrical power source, a voltage limiter connected to the outputs of the rectifier circuit, and a chopper connected to outputs of the limiter and supplying a voltage to an input of the second regulating means.

8. The trip device according to claim 7, wherein the chopper comprises a transformer comprising a primary winding supplied by means of an oscillator and a secondary winding electrically isolated from the primary winding and connected to the input of the second regulating means.

9. The trip device according to claim 8, wherein the chopper is of the flyback type.

* * * * *